(12) United States Patent
Tomiyoshi

(10) Patent No.: US 7,045,993 B1
(45) Date of Patent: May 16, 2006

(54) APPARATUS AND METHOD FOR STEP-DOWN SWITCHING VOLTAGE REGULATION

(75) Inventor: Kenji Tomiyoshi, Cupertino, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 78 days.

(21) Appl. No.: 10/835,616

(22) Filed: Apr. 29, 2004

(51) Int. Cl.
*G05F 1/613* (2006.01)

(52) U.S. Cl. ........................... 323/224; 323/228

(58) Field of Classification Search ............... 323/224, 323/283, 284, 288
See application file for complete search history.

(56) References Cited

U.S. PATENT DOCUMENTS 6,246,220 B1 * 6/2001 Isham et al. ............... 323/224
6,396,252 B1   5/2002 Culpepper et al.
6,476,589 B1 * 11/2002 Umminger et al. ......... 323/282

* cited by examiner

*Primary Examiner*—Shawn Riley
(74) *Attorney, Agent, or Firm*—Darby & Darby PC; Matthew M. Gaffney

(57) ABSTRACT

A current mode PWM buck regulator is provided. The regulator includes a top-side transistor, a bottom-side transistor, an inductor, a sample-and-hold circuit, a ramp generator, a PWM comparator, an error amplifier, and a current sense amplifier. A current through the low-side transistor is sensed by the current sense amplifier. Also, a current sense voltage provided by the current sense amplifier is sampled when the low-side transistor is on, and held when the low-side transistor is off. The ramp generator is arranged to generate a voltage ramp that emulates the upslope of the inductor current. Additionally, the sampled low-side transistor current is combined with the voltage ramp. The PWM comparator is arranged to provide a PWM signal by comparing the voltage ramp to a comparison signal provided by the error amplifier.

21 Claims, 4 Drawing Sheets

APPARATUS AND METHOD FOR STEP-DOWN SWITCHING VOLTAGE REGULATION

FIELD OF THE INVENTION

The invention is related to voltage regulation, and in particular, to an apparatus and method for a step-down switch voltage regulator circuit that samples a sensed current of the low-side switch.

BACKGROUND OF THE INVENTION

A step-down switching regulator may be configured to provide a regulated output voltage (Vout) in response to an input voltage (Vin). The switching regulator may include a top-side transistor and a bottom-side transistor. When the top-side transistor is on and the bottom-side transistor is off, Vin−Vout is applied across an inductor, causing the inductor current to ramp upwards. When the top-side transistor is off and the bottom-side transistor is on, the inductor current ramps downwards. The inductor current is applied to a capacitor to provide the output voltage. Also, feedback may be employed to control the duty cycle of the switching. The output voltage may be sensed to provide the feedback. In current mode switching regulators, current sensing is also employed. Previously, current sensing has been accomplished by coupling a resistor in series with the inductor, and sensing a voltage drop across the resistor.

BRIEF DESCRIPTION OF THE DRAWINGS

Non-limiting and non-exhaustive embodiments of the present invention are described with reference to the following drawings, in which.

DETAILED DESCRIPTION

Figure 1:
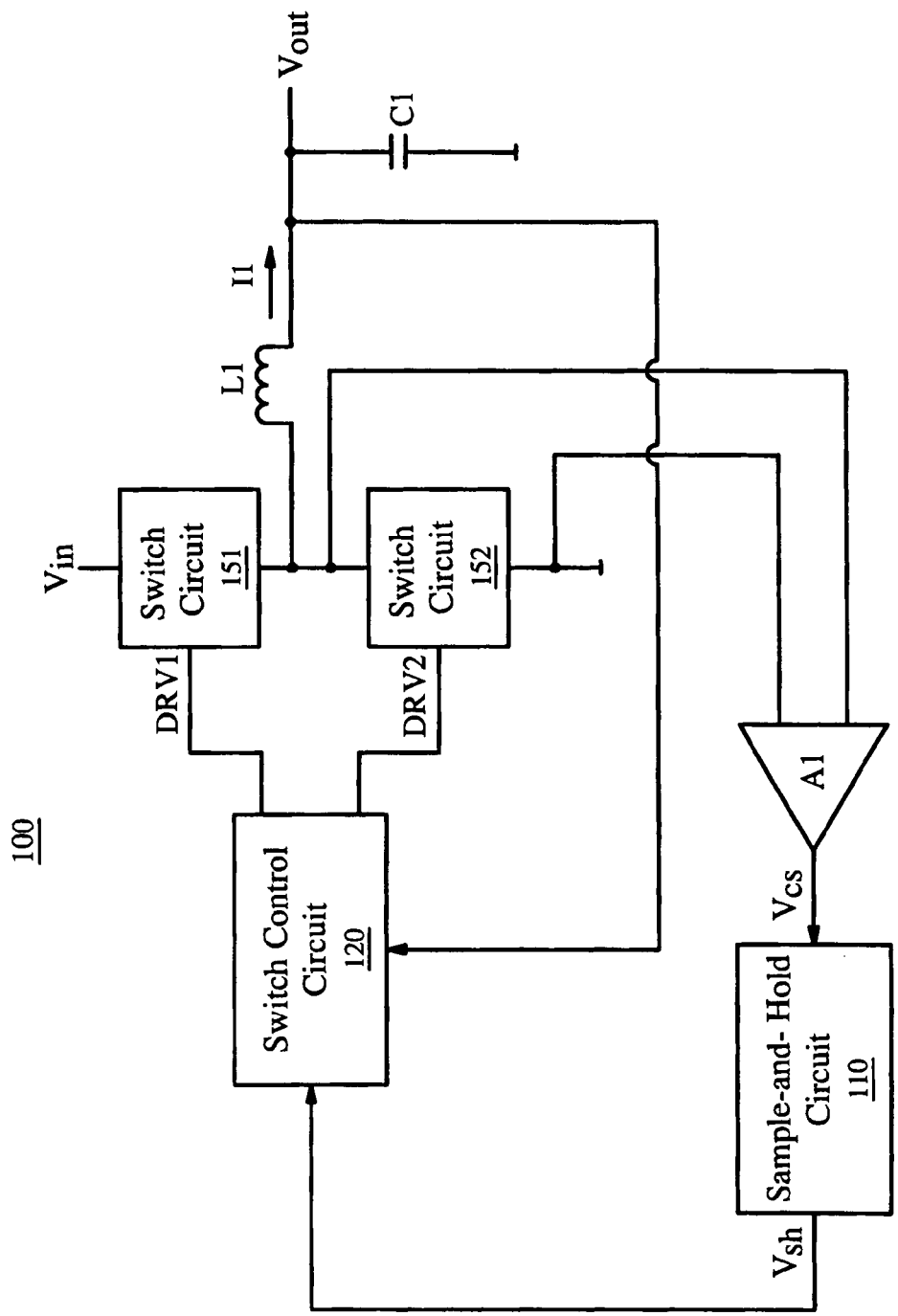
FIG. 1 illustrates a block diagram of an embodiment of a regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, and the meaning of "in" includes "in" and "on." The term "connected" means a direct electrical connection between the items connected, without any intermediate devices. The phrase "in one embodiment," as used herein does not necessarily refer to the same embodiment, although it may. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a current mode PWM buck regulator. The regulator includes a top-side transistor, a bottom-side transistor, an inductor, a sample-and-hold circuit, a ramp generator, a PWM comparator, an error amplifier, and a current sense amplifier. A current through the low-side transistor is sensed by the current sense amplifier. Also, a current sense voltage provided by the current sense amplifier is sampled when the low-side transistor is on, and held when the low-side transistor is off. The ramp generator is arranged to generate a voltage ramp that emulates the upslope of the inductor current. Additionally, the sampled low-side transistor current is combined with the voltage ramp. The PWM comparator is arranged to provide a PWM signal by comparing the voltage ramp to a comparison signal provided by the error amplifier.

FIG. 1 illustrates a block diagram of an embodiment of regulator circuit 100. Regulator circuit 100 includes top-side switch circuit 151, bottom-side switch circuit 152, inductor circuit L1, capacitor circuit C1, current-sense amplifier circuit A1, sample-and-hold circuit 110, and switch control circuit 120.

Inductor circuit L1 is arranged to provide current I1. More specifically, inductor circuit L1 is arranged such that a voltage substantially given by Vin−Vout is across inductor L1 when switch circuit 151 is closed. Accordingly, dI1/dt is substantially given by (Vin−Vout)/L1 when switch circuit 151 is closed.

Also, capacitor circuit C1 is configured to provide output voltage Vout from current I1. Current-sense amplifier A1 is configured to sense a current across switch circuit 152 and provide current sense voltage Vcs in response to the sensed current. Additionally, sample-and-hold circuit 110 is configured to sample voltage Vcs when switch circuit 152 is closed, and further configured to hold voltage Vcs when switch circuit 152 is open. Switch control circuit 120 is configured to provide signals DRV1 and DRV2 based in part on signals Vout and Vsh. Further, switch control circuit 120 is configured to provide signal DRV2 as an inverse of signal DRV1. Switch circuit 151 is configured to open and close responsive to signal DRV1, and switch circuit 152 is configured to open and close responsive to signal DRV2.

Figure 2:
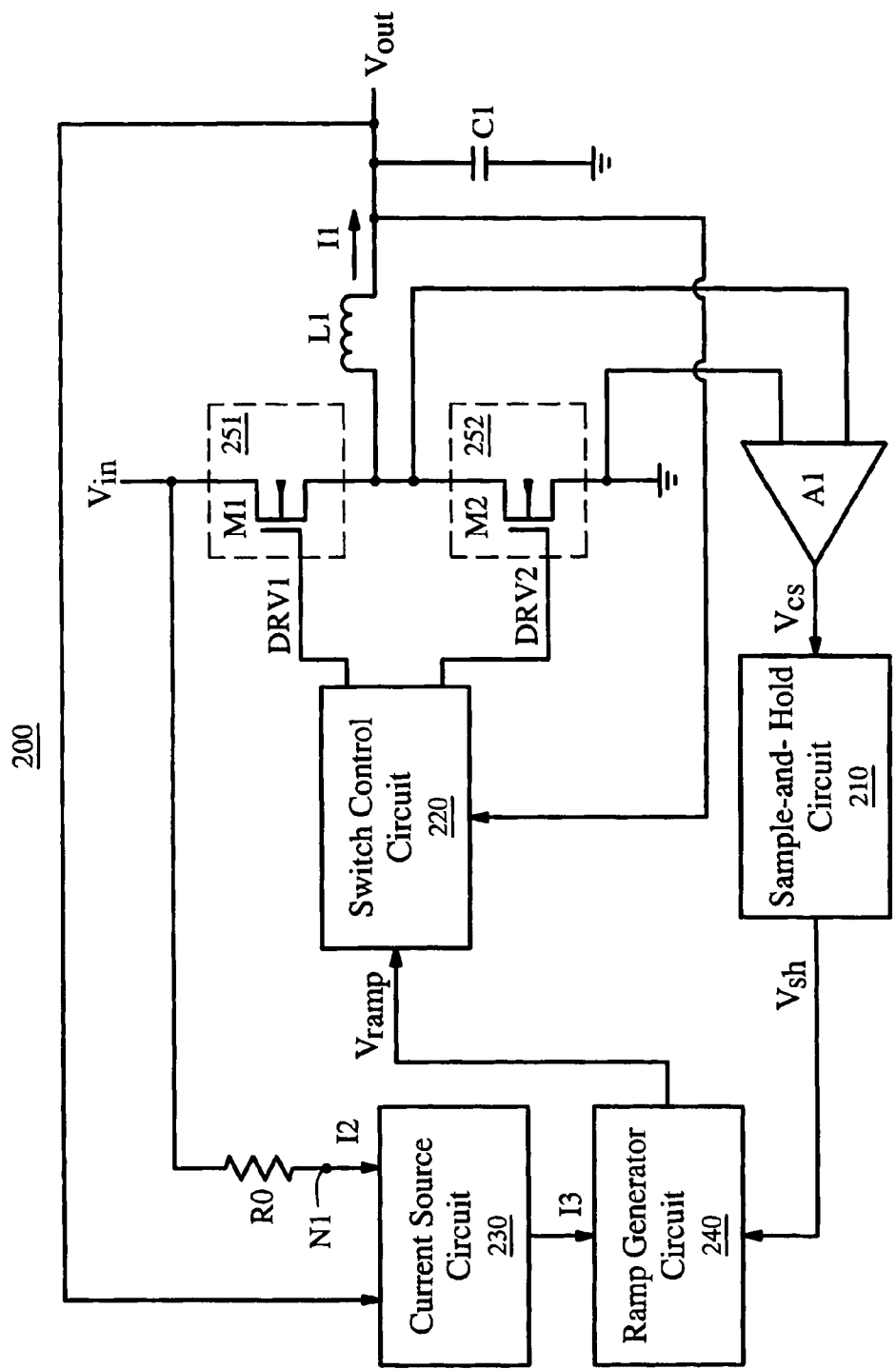
FIG. 2 shows a block diagram of an embodiment of the regulator circuit of FIG. 1 that includes a current source circuit for emulating the inductor current.

FIG. 2 shows a block diagram of an embodiment of regulator circuit 200 that includes a current source circuit for emulating the inductor current. Components in regulator circuit 200 may operate in a substantially similar manner to similarly named components in regulator circuit 100, and may operate in a different manner in some ways. Regulator circuit 200 further includes current source circuit 230 and resistor R0. In regulator circuit 200, top-side switch circuit 151 includes transistor M1, and bottom-side switch circuit 152 includes transistor M2.

In operation, current source circuit 230 is configured to provide a voltage that is substantially equal output voltage Vout at node N1. Accordingly, resistor R0 has a voltage substantially equal to Vin−Vout across it. Resistor R0 is arranged to provide current I2, where current I2 is substantially given by (Vin-Vout)/R0. Also, current source circuit 230 is further configured to provide current I3 from current I2.

Additionally, ramp generator circuit 240 provides voltage Vramp from current I3 and voltage Vsh. By proper pre-selection of a resistance that is associated with resistor R0, the upslope associated with voltage Vramp is substantially similar to the upslope associated with current I1. Also, the voltage ramp is offset according to voltage Vsh. Accordingly, voltage Vramp substantially emulates current I1. Switch control circuit 220 is arranged to provide signals DRV1 and DRV2, based in part on signals Vramp and Vout.

Figure 3:
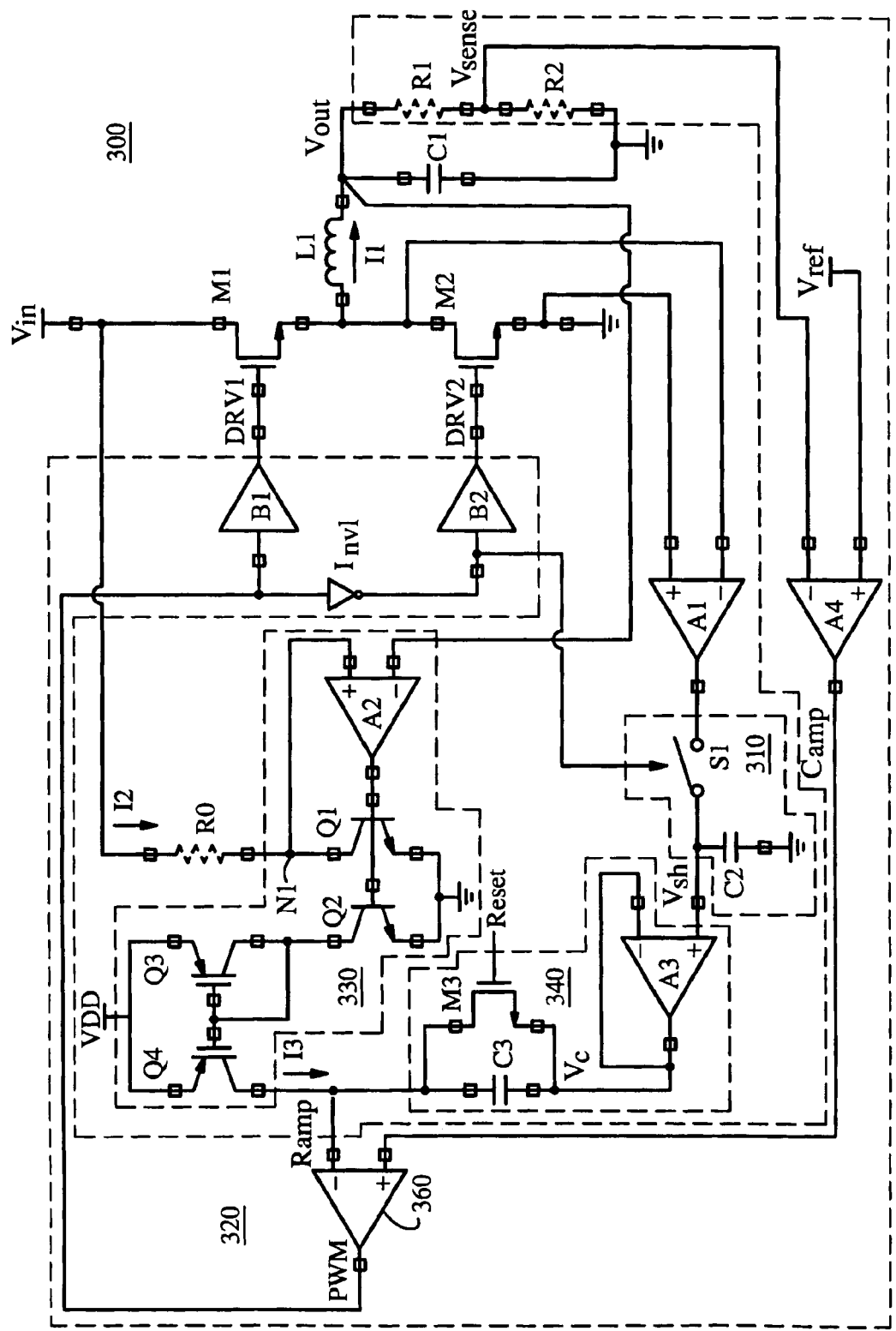
FIG. 3 schematically illustrates an embodiment of the regulator circuit of FIG. 2.

FIG. 3 schematically illustrates an embodiment of regulator circuit 300. Components in regulator circuit 300 may operate in a substantially similar manner to similarly named components in regulator circuit 300, and may operate in a different manner in some ways. Current source circuit 330 may include transistors Q1–Q4 and operational amplifier circuit A2. Sample-and-hold circuit 310 includes switch circuit S1 and capacitor circuit C2. Also, ramp generator circuit 340 may include capacitor circuit C3, transistor M3, and operational amplifier circuit A3. Switch control circuit 320 may include resistors R1 and R2, error amplifier A4, PWM comparator circuit 360, Inverter Inv1, and buffers B1 and B2.

In operation, operational amplifier circuit A2 may adjust the base voltage of transistors Q1 and Q2 such that the voltage at node N1 is substantially equal to output voltage Vout. Transistors Q1 and Q2 may be arranged as a current source to mirror current I2 to the collector of transistor Q3. Similarly, transistors Q3 and Q4 may be arranged as another current source that is configured to mirror the collector current of transistor Q3 to provide current I3.

Also, transistor M3 is arranged as a switch that is responsive to signal Reset. Amplifier circuit A3 may be arranged as a follower, such that sensed signal Vc is substantially equal to voltage Vsh. When signal Reset is low, signal Ramp begin linearly increasing from signal Vc. In this way, signal Vc is combined with signal Ramp. Signal Ramp continues to linearly increase until signal Reset changes to high. When signal Reset changes to high, capacitor C3 discharges, and signal Ramp returns to voltage Vc.

Further, the upslope associated with signal Ramp is substantially given by $dV/dt \sim (Vin-Vout)/(R0*C3)$. Accordingly, by properly pre-selecting the resistance of resistor R0, the upslope of the voltage ramp is substantially similar to the upslope of inductor current I1.

Additionally, in one embodiment, if Vin is substantially greater than Vout, the value of Vout can be ignored, e.g., where Vin is relatively equivalent to 10 volts and Vout is relatively equivalent to 1 volt. In this embodiment, the upslope associated with signal Ramp can be represented by $dV/dt \sim Vin/(R0*C3)$.

Also, resistors R1 and R2 may be arranged as a voltage divider that is configured to provide voltage Vsense from voltage Vout. Error amplifier A4 may be configured to provide signal Comp from signals Vsense and Vref. PWM comparator circuit 360 is configured to provide signal PWM from in response to a comparison of signals Comp and Ramp. Buffer B1 may be configured to provide signal DRV1 from signal PWM. Also, inverter circuit Inv1 may be arranged to invert signal DRV1. Buffer B2 may be arranged to buffer the output signal of inverter circuit Inv1 to provide signal DRV2.

Although a particular arrangement regulator circuit 300 is illustrated in FIG. 3, other embodiments may include other arrangements of circuit 300. For example, buffers B1 and B2 and operational amplifier A3 are optional circuit components that need not be included in regulator circuit 300. Additionally, current source circuit 330 may be arranged in a different manner than shown in FIG. 3. Also, although operational amplifier A2 is employed to provide a voltage that is substantially equal to Vout at node N1, operational amplifier A2 may be replaced with a different circuit that is arranged to provide a voltage that is substantially equal to Vout at node N1. Although FIG. 3 illustrates an embodiment in Inverter Inv1 is employed to provide signal DRV2 as an inverse of signal DRV1, in other embodiments, other arrangements may be employed to provide signal DRV2 as an inverse of signal DRV1.

Figure 4:
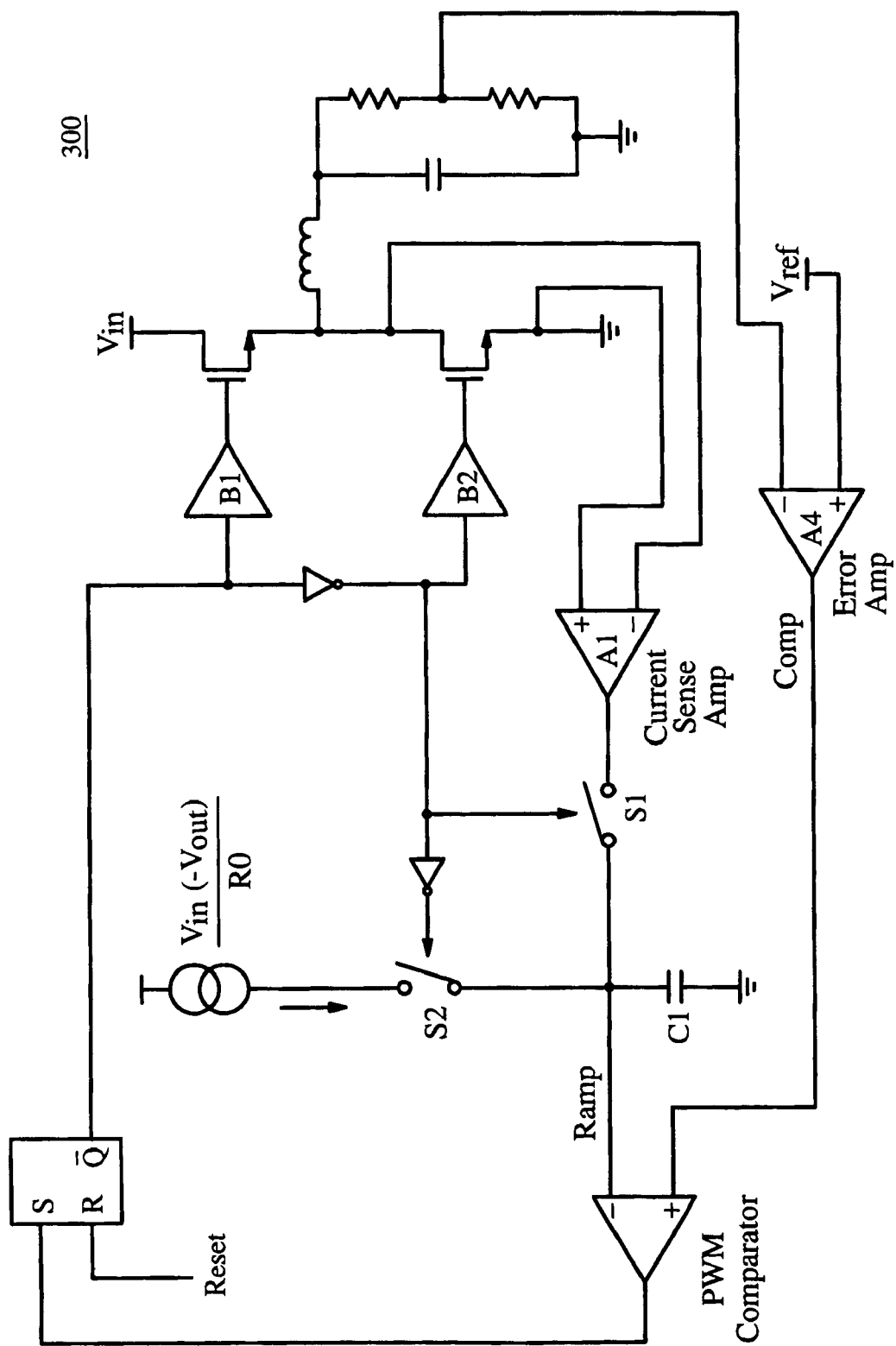
FIG. 4 schematically illustrates another embodiment of the invention arranged in accordance with aspects of the present invention.

FIG. 4 illustrates another embodiment of the invention where the operation of a ramp generator capacitive element and a sample and hold capacitive element are combined in one capacitive element C1. In this embodiment, if S1 is closed, the combined capacitor operates as the sample and hold capacitor discussed above. Similarly, if S2 is closed, the combined capacitor operates as the ramp generator capacitor discussed above. Further, when the low side switch is on, S1 is on and S2 is off.

Each of the resistor circuits described may consist of a single resistor only, or may include a plurality of resistors that are coupled in series or in parallel, and the like. Similarly, each of the capacitor circuits describe may consist of a single capacitor only, or may include a plurality of capacitors that are coupled in series or in parallel, and the like. These and other embodiments are within the spirit and scope of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for switched buck regulation, comprising:
    an inductor circuit that is arranged to provide an inductor current;
    a capacitor circuit that is arranged to provide an output voltage from the inductor current;
    a bottom-side switch circuit that is coupled between a ground node and the inductor circuit, wherein the bottom-side switch is arranged to open and close responsive to a first switch control signal;
    a top-side switch circuit that is coupled between the inductor circuit and an input node, wherein the top-side switch circuit is configured to receive an input voltage at the input node, and wherein the top-side switch circuit is arranged to open and close responsive to a second switch control signal;
    a current sense amplifier circuit that is arranged to sense a current across the bottom-side switch circuit, and further arranged to provide a current sense voltage in response to the current, wherein the current sense voltage is approximately proportional to the sensed current;
    a sample-and-hold circuit that is arranged to sample the current sense voltage if the bottom-side switch is closed, and further arranged to hold the current sense voltage if the bottom-side switch is open, wherein the sample-and-hold circuit is arranged to provide a sample-and-hold signal; and
    a switch control circuit that is configured to provide the first and second switch control signals based in part on the sample-and-hold signal and the output voltage.

2. The circuit of claim 1, wherein the top-side switch circuit includes a transistor, and wherein the bottom-side switch circuit includes another transistor.

3. The circuit of claim 1, wherein the sample-and-hold circuit includes a switched capacitor.

4. A circuit for switched buck regulation comprising:
an inductor circuit that is arranged to provide an inductor current;
a capacitor circuit that is arranged to provide an output voltage from the inductor current;
a bottom-side switch circuit that is coupled between a ground node and the inductor circuit, wherein the bottom-side switch is arranged to open and close responsive to a first switch control signal;
a top-side switch circuit that is coupled between the inductor circuit and an input node, wherein the top-side switch circuit is configured to receive an input voltage at the input node, and wherein the top-side switch circuit is arranged to open and close responsive to a second switch control signal;
a current sense amplifier circuit that is arranged to sense a current across the bottom-side switch circuit, and further arranged to provide a current sense voltage in response to the current;
a sample-and-hold circuit that is arranged to sample the current sense voltage if the bottom-side switch is closed, and further arranged to hold the current sense voltage if the bottom-side switch is open, wherein the sample-and-hold circuit is arranged to provide a sample-and-hold signal;
a switch control circuit that is configured to provide the first and second switch control signals based in part on the sample-and-hold signal and the output voltage; and
a resistor that is arranged such that a voltage across the resistor is substantially equal to the difference between the input voltage and the output voltage, and further arranged to provide a resistor current from the voltage across the resistor.

5. A circuit for switched buck regulation, comprising:
an inductor circuit that is arranged to provide an inductor current;
a capacitor circuit that is arranged to provide an output voltage from the inductor current;
a bottom-side switch circuit that is coupled between a ground node and the inductor circuit, wherein the bottom-side switch is arranged to open and close responsive to a first switch control signal;
a top-side switch circuit that is coupled between the inductor circuit and an input node, wherein the top-side switch circuit is configured to receive an input voltage at the input node, and wherein the top-side switch circuit is arranged to open and close responsive to a second switch control signal;
a current sense amplifier circuit that is arranged to sense a current across the bottom-side switch circuit, and further arranged to provide a current sense voltage in response to the current;
a sample-and-hold circuit that is arranged to sample the current sense voltage if the bottom-side switch is closed, and further arranged to hold the current sense voltage if the bottom-side switch is open, wherein the sample-and-hold circuit is arranged to provide a sample-and-hold signal;
a switch control circuit that is configured to provide the first and second switch control signals based in part on the sample-and-hold signal and the output voltage;
a resistor that is arranged such that a voltage across the resistor is substantially equal to the difference between the input voltage and the output voltage, and further arranged to provide a resistor current from the voltage across the resistor; and
a current source circuit that is arranged to mirror the resistor current to provide a charge current to a ramp generator.

6. The circuit of claim 5, wherein the current source circuit includes:
a first current source that is arranged to mirror the resistor current to provide another current; and
a second current source that is arranged to mirror the other current to provide the charge current to the ramp generator.

7. The circuit of claim 6, further comprising:
an operational amplifier circuit that is coupled to the resistor at a first node, wherein the resistor is coupled between the input node and the first node, and wherein the operational amplifier circuit is arranged to adjust a base voltage that is associated with the first current source such that a voltage that is associated with the first node is approximately equal to the output voltage.

8. The circuit of claim 5, wherein the ramp generator current is arranged to provide a voltage ramp signal based on the ramp generator current and a sensed signal that is based on the sample-and-hold signal.

9. The circuit of claim 8, wherein the ramp generator circuit is further arranged to be responsive to a reset signal such that the ramp signal substantially discharges to a voltage that is associated with the sensed signal when the reset signal is asserted, and such that the ramp signal substantially linearly increases when the reset signal is unasserted such that the linear increase is substantially similar to a linear increase that is associated with the inductor current.

10. The circuit of claim 8, wherein the ramp generator circuit includes:
a ramp generator capacitor circuit that is coupled between second and third nodes, wherein the capacitor circuit is arranged to receive the ramp generator current at the second node, and further arranged to receive the sensed signal at the third node; and
a switch circuit that is arranged to discharge the ramp generator capacitor circuit if a reset signal is asserted.

11. A circuit for switched buck regulation, comprising:
an inductor circuit that is arranged to provide an inductor current;
a capacitor circuit that is arranged to provide an output voltage from the inductor current;
a bottom-side switch circuit that is coupled between a ground node and the inductor circuit, wherein the bottom-side switch is arranged to open and close responsive to a first switch control signal;
a top-side switch circuit that is coupled between the inductor circuit and an input node, wherein the top-side switch circuit is configured to receive an input voltage at the input node, and wherein the top-side switch circuit is arranged to open and close responsive to a second switch control signal;
a current sense amplifier circuit that is arranged to sense a current across the bottom-side switch circuit, and further arranged to provide a current sense voltage in response to the current;
a sample-and-hold circuit that is arranged to sample the current sense voltage if the bottom-side switch is closed, and further arranged to hold the current sense voltage if the bottom-side switch is open, wherein the sample-and-hold circuit is arranged to provide a sample-and-hold signal;

a switch control circuit that is configured to provide the first and second switch control signals based in part on the sample-and-hold signal and the output voltage;

a resistor;

a current source circuit; and a ramp generator circuit that is configured to provide a voltage ramp signal, wherein the resistor, current source circuit, and ramp generator circuit are arranged such that the voltage ramp signal has an upslope that is substantially similar to an upslope that is associated with another upslope that is associated with the inductor current.

12. The circuit of claim 11, wherein a voltage across the resistor is substantially equal to difference between the input voltage and the output voltage.

13. The circuit of claim 11, wherein the ramp generator signal includes a capacitor, and wherein the capacitor is arranged to discharge if a reset signal is asserted.

14. The circuit of claim 11, wherein the switch control circuit includes a pulse width modulation comparator that is configured to provide the second control signal based on a comparison between the voltage ramp signal and a comparison signal, wherein the comparison signal is based in part on the output voltage.

15. The circuit of claim 14, wherein the switch control circuit further includes a voltage divider circuit that is arranged to provide a sensed voltage from the output voltage.

16. The circuit of claim 15, wherein the switch control circuit further includes an error amplifier circuit that is arranged to provide the comparison signal from the sensed voltage and a reference voltage.

17. A circuit for switched buck regulation, comprising:
an inductor circuit that is coupled between a switch node and an output node;
a capacitor circuit that is coupled to the output node;
a bottom-side switch circuit that is coupled between a ground node and the switch node;
a top-side switch circuit that is coupled between switch node and an input node;
a current sense amplifier circuit including a first input that is coupled to the switch node, and further including a second input that is coupled to the ground node;
a sample-and-hold circuit including an input that is coupled to an output of the current sense amplifier circuit; and
a switch control circuit including a first input that is coupled to an output of the sample-and-hold circuit, another input that is coupled to the output node, a first output that is coupled to the top-side switch circuit, and a second output that is coupled to the bottom-side switch circuit.

18. A circuit for switched buck regulation, comprising:
an inductor circuit that is coupled between a switch node and an output node;
a capacitor circuit that is coupled to the output node;
a bottom-side switch circuit that is coupled between a ground node and the switch node;
a top-side switch circuit that is coupled between switch node and an input node;
a current sense amplifier circuit including a first input that is coupled to the switch node, and further including a second input that is coupled to the ground node;
a sample-and-hold circuit including an input that is coupled to an output of the current sense amplifier circuit;
a switch control circuit including a first input that is coupled to an output of the sample-and-hold circuit, another input that is coupled to the output node, a first output that is coupled to the top-side switch circuit, and a second output that is coupled to the bottom-side switch circuit;
a current source circuit that includes a first current source;
a resistor that is coupled between the input node and a collector that is associated with the first current source; and
a ramp generator circuit that is coupled to the current source circuit, the sample-and-hold circuit, and the switch control circuit.

19. The circuit of claim 18, wherein the switch control circuit includes:
a resistor divider circuit that is coupled to the output node;
an error amplifier circuit that is coupled to the resistor divider circuit; and
a PWM comparator circuit including a first input that is coupled to the error amplifier and a second input that is coupled to the ramp generator circuit.

20. A circuit for switched buck regulation, comprising:
a means for providing a ramping current;
a means for providing an output voltage from the ramping current;
a means for coupling a ground node to the means for providing the ramping current if a first switch control signal is asserted;
a means for coupling an input node to the means for providing the ramping current if a second switch control signal is asserted;
a means for sensing a current across the means for coupling the ground node to the means for providing the ramping current;
a means for providing a current sense voltage in response to the current, wherein the current sense voltage is approximately proportional to the current;
a means for sampling the current sense voltage if the means for providing the ramping current is coupled to the ground node;
a means for holding the current sense voltage if the means for providing the ramping current is coupled to the input node; and
a means for providing the first and second switch control signals based in part on the current sense voltage and the output voltage.

21. A circuit for voltage regulation, comprising:
a switch control circuit that is operable to provide a first switch control signal to a first switch, and to provide a second switch control signal to a synchronous switch, such that the first and second control signals are based in part on a sample-and-hold signal and an output voltage;
a current sense circuit that is operable to sense a current across the synchronous switch, and to provide a current sense voltage at a current sense node in response to the sensed current; and
a sample-and-hold circuit that is operable to sample the current sense voltage if the synchronous switch is closed, and further arranged to hold the current sense voltage if the synchronous switch is open, wherein the sample-and-hold circuit is arranged to provide the sample-and-hold signal at a capacitor node, and wherein the sample-and-hold circuit includes:
a switch that is coupled between the current sense node and a capacitor node, wherein the switch is operable to close if the synchronous switch is closed, and to open if the synchronous switch is open.

* * * * *